(12) United States Patent
Fu et al.

(10) Patent No.: US 7,654,724 B2
(45) Date of Patent: Feb. 2, 2010

(54) GROUND PLATE AND BACKLIGHT MODULE UTILIZING THE SAME

(75) Inventors: Yu-Yan Fu, Tanzih Township, Taichung County (TW); Ying Szu Tu, Longjing Township, Taichung County (TW)

(73) Assignee: Au Optronics Corp., Hsinchu (TW)

( * ) Notice: Subject to any disclaimer, the term of this patent is extended or adjusted under 35 U.S.C. 154(b) by 102 days.

(21) Appl. No.: 10/967,510

(22) Filed: Oct. 18, 2004

(65) Prior Publication Data
US 2006/0012983 A1    Jan. 19, 2006

(30) Foreign Application Priority Data
Jul. 15, 2004    (TW) .............................. 93121116 A

(51) Int. Cl.
*F21V 7/04* (2006.01)
(52) U.S. Cl. ...................................... 362/630; 362/614
(58) Field of Classification Search .............. 362/630, 362/614
See application file for complete search history.

(56) References Cited

U.S. PATENT DOCUMENTS

| 4,376,559 | A  | * | 3/1983 | Instone, Jr. ................... 439/96 |
| 6,242,930 | B1 | * | 6/2001 | Matsunaga et al. .......... 324/754 |
| 6,459,203 | B1 | * | 10/2002 | Kim ........................... 362/225 |
| 7,090,387 | B2 | * | 8/2006 | Kohno ......................... 362/631 |
| 2003/0223234 | A1 | * | 12/2003 | Tang ........................... 362/226 |
| 2004/0232853 | A1 | * | 11/2004 | Hur et al. ..................... 315/291 |
| 2005/0024320 | A1 | * | 2/2005 | Nowatzyk ................... 345/108 |

OTHER PUBLICATIONS http://dictionary.reference.com/browse/on.*

* cited by examiner

*Primary Examiner*—Sandra L O'Shea
*Assistant Examiner*—William J Carter
(74) *Attorney, Agent, or Firm*—Thoman, Kayden, Horstemeyer & Risley

(57) ABSTRACT

A backlight module and a ground plate thereof. The backlight module includes a plurality of lamps and a ground plate. Each lamp includes a tube body and an electrode. The ground plate includes a plurality of notches, corresponding to the electrode, to hold the electrode. The ground plate also includes a first side portion, a bottom portion, and a second side portion. The notches are formed at the first side portion. The bottom portion is connected to the first side portion. The second side portion is connected to the bottom portion. The first side portion is closer to the tube body than the second side portion.

20 Claims, 3 Drawing Sheets

GROUND PLATE AND BACKLIGHT MODULE UTILIZING THE SAME

BACKGROUND

The invention relates to a backlight module, and in particular, to a backlight module with a ground plate capable of stably holding lamps thereon.

In a direct-type backlight module, a plurality of lamps are utilized as a light source. Since the number of the lamps varies, the lamps are typically grounded by a single ground plate.

Referring to FIG. 1, electrodes 2a of lamps 2 are supported by a ground plate 2. Since the conventional ground plate 2 cannot hold the lamps stably at predetermined positions, gaps between the lamps cannot be maintained during manufacture. Furthermore, it is difficult to solder the electrode on the ground plate since the solder cannot completely surround the electrode, thus yield suffers. Additionally, the solder is difficult to control, thus the aesthetic appearance suffers. Moreover, the strength of the conventional ground plate is weak.

SUMMARY

Accordingly, an embodiment of the invention provides a backlight module comprising a plurality of lamps and a ground plate. Each lamp has an electrode respectively. The ground plate has a plurality of concave recesses. Each concave recess is formed in accordance with the location of the electrode.

Each lamp further comprises a tube body. The ground plate comprises a first side portion, a bottom portion, and a second side portion. The concave recesses are formed on the first side portion and the second side portion. The bottom portion is connected to the first side portion, and comprises one or more protrusion around each concave recess. The concave recesses on the second side portion correspond to the concave recesses on the first side portion. The second side portion is connected to the bottom portion. The first side portion is closer to the tube body than the second side portion. The first side portion, the bottom portion, and the second side portion are formed as a unity body.

Moreover, each lamp comprises a rubber block between the tube body and the electrode. The first side portion abuts the rubber block.

It is noted that ground plate may comprise copper, each concave recess may be V-shaped or U-shaped, and a cross section of the ground plate may be U-shaped.

BRIEF DESCRIPTION OF THE DRAWINGS

Embodiments of the present invention can be more fully understood by reading the subsequent detailed description and examples with references made to the accompanying drawings, wherein.

DETAILED DESCRIPTION

Figure 1:
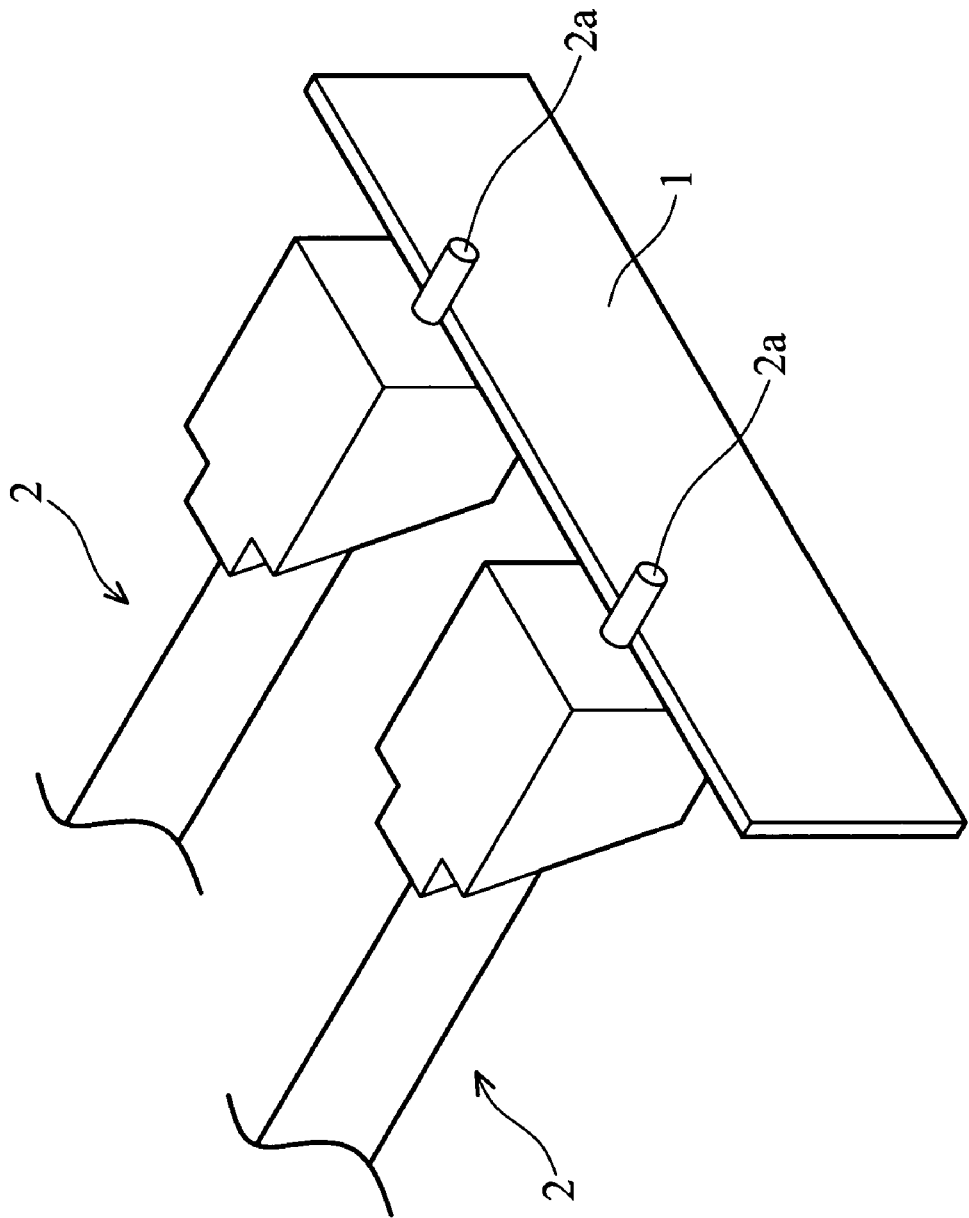
FIG. 1 is a schematic view of a conventional ground plate.
Figure 2:
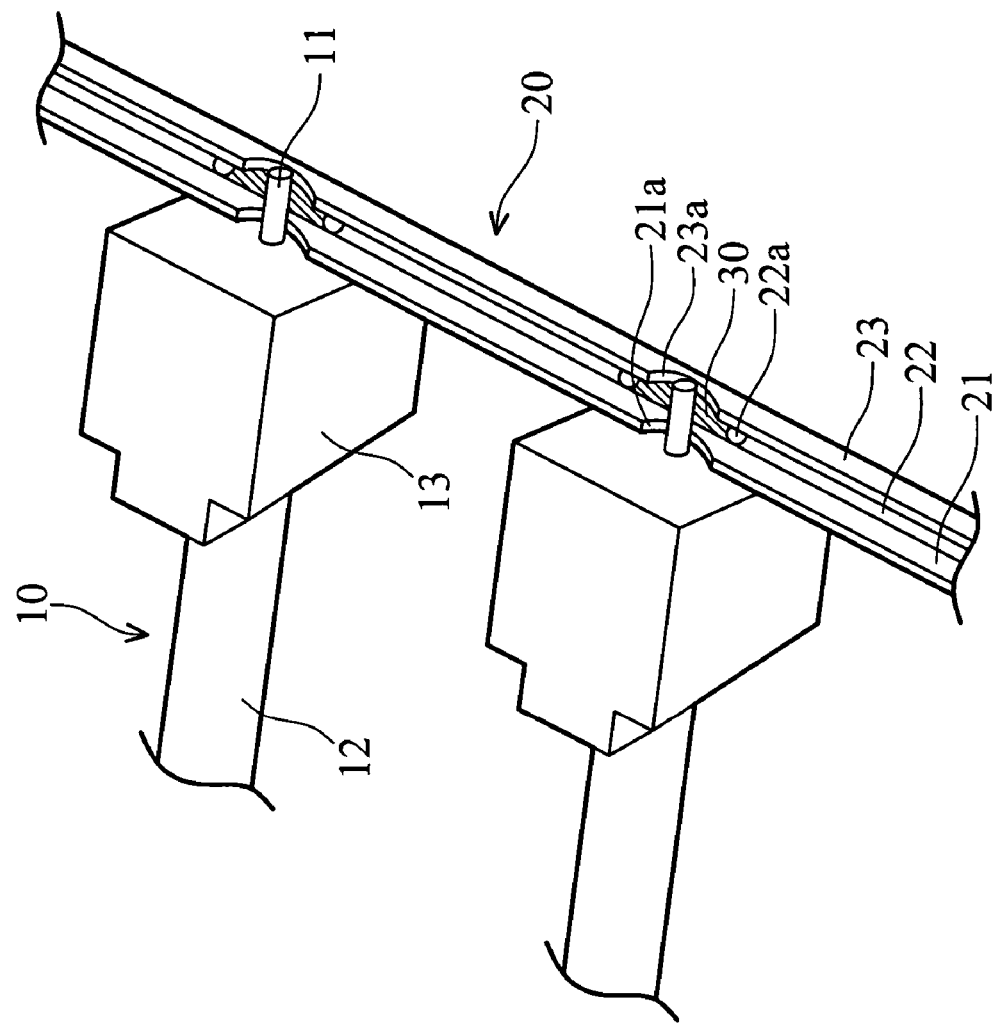
FIG. 2 is a schematic view of a backlight module as disclosed in an embodiment of the invention.

FIG. 2 shows a backlight module 100 comprising a plurality of lamps 10 and a ground plate 20. It is understood that although the description of this embodiment is based on the backlight module, the ground plate 20 may be applied in other electronic devices wherein lamps require fixing.

The lamps 10 are used as a light source of the backlight module 100. Each lamp 10 comprises an electrode 11, a tube body 12, and a rubber block 13 between the tube body 12 and the electrode 11 respectively.

As shown in FIG. 2, the ground plate 20 may be divided into a first side portion 21, a bottom portion 22, and a second side portion 23. The first side portion 21 abuts the rubber block 13 of the lamp 10, and is closer to the tube body 12 of the lamp 10 than the second side portion 23. The ground plate 20 has a plurality of concave recesses 21a at the first side portion 21. Each concave recess 21a is formed in accordance with the location of the electrode 11 of the lamp 10 to hold the electrode 11. The bottom portion 22 is connected to the first side portion 21, and comprises two protrusions 22a around each recess 21a to enhance the strength of the ground plate 20. Solder 30 can also be controlled by the protrusions 22a during manufacture. The second side portion 23 is connected to the bottom portion 22, and comprises a plurality of concave recesses 23a. The concave recesses 23a on the second side portion 23 are formed in accordance with the locations of the concave recesses 21a on the first side portion 21 to support and hold the electrodes 11.

Note that ground plate 20 may comprise copper, and a cross section thereof may be U-shaped to minimize the width and enhance the strength thereof. Furthermore, the first side portion 21, the bottom portion 22, and the second side portion 23 may be formed as a unitary body.

Figure 3:
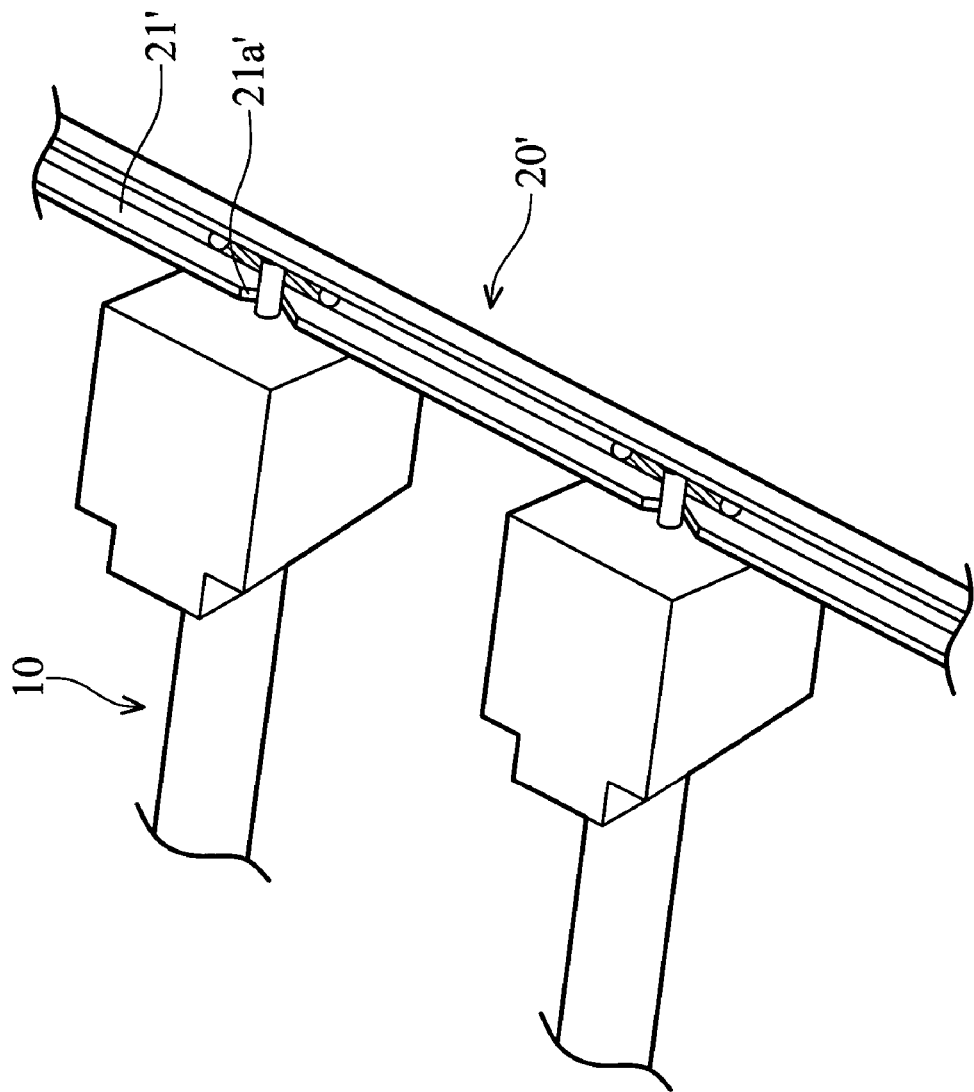
FIG. 3 is a schematic view of a ground plate as disclosed in a variant embodiment of the invention.

Additionally, in FIG. 2, each concave recess 21a, 23a is U-shaped, but is not limited thereto. Referring to FIG. 3, concave recesses 21a' are V-shaped. Moreover, in FIG. 2, both the first and second side portions 21 and 23 comprise the concave recesses 21a and 23a, but are not limited thereto. Referring to FIG. 3, only the second side portion 21' comprises the concave recesses 21a'.

Since the ground plate of this embodiment of the invention comprises concave recesses at the side portions, the electrodes of the lamps can be stably supported, thus maintaining the gaps between the lamps. Additionally, since the cross section of the ground plate is U-shaped, the strength thereof can be enhanced without increasing the width. Moreover, since the solder can be controlled by the protrusions of the bottom portion and the U-shaped cross section of the ground plate, the electrodes can be properly surrounded by solder, thus increasing yield.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module comprising:
    a plurality of coplanar lamps substantially situated on a common plane and having an electrode and a tube body respectively; and
    an elongated grounding bar, comprising:
        a first side portion;
        a bottom portion, connecting the first side portion; and
        a second side portion, connecting the bottom portion, wherein the first side portion is closer to the tube body than the second side portion, and the bottom portion and the first and second side portions form a ditch with a solder material accommodated therein;

a plurality of concave recesses formed on the edge of the first and second side portions and aligned along an axis substantially parallel to the common plane, wherein a cross section of the grounding bar perpendicular to the axis is U-shaped, and the electrodes are disposed on the concave recesses.

2. The backlight module as claimed in claim 1, wherein the bottom portion and the first and second side portions form a ditch.

3. The backlight module as claimed in claim 1, wherein the bottom portion comprises a plurality of protrusions around each concave recess.

4. The backlight module as claimed in claim 1, wherein the first side portion, the bottom portion, and the second side portion are formed as a unitary body.

5. The backlight module as claimed in claim 1, wherein each lamp comprises a rubber block between the tube body and the electrode, and the first side portion abuts the rubber block.

6. The backlight module as claimed in claim 1, wherein the grounding bar comprises copper.

7. The backlight module as claimed in claim 1, wherein each concave recess is V-shaped or U-shaped.

8. An elongated grounding bar for grounding a plurality of coplanar lamps, wherein each lamp comprises a tube body and an electrode, and the elongated grounding bar comprises:
   an elongated grounding bar, comprising:
      a first side portion;
      a bottom portion, connecting the first side portion and comprising a plurality of protrusions; and
      a second side portion, connecting the bottom portion, wherein the first side portion is closer to the tube body than the second side portion, and the bottom portion and the first and second side portions form a ditch with a solder material accommodated therein, and the protrusions are disposed between the first and second side portions;
      a plurality of concave recesses formed on one edge of the first and second side portions and aligned along an axis substantially parallel to the common plane, wherein a cross section of the grounding bar perpendicular to the axis is U-shaped, and the electrodes are disposed on the concave recesses.

9. The grounding bar as claimed in claim 8, wherein the solder material is accommodated between the protrusions.

10. The grounding bar as claimed in claim 8, wherein the protrusions are located around each concave recess.

11. The grounding bar as claimed in claim 8, wherein the first side portion, the bottom portion, and the second side portion are formed as a unitary body.

12. The grounding bar as claimed in claim 8, wherein the grounding bar comprises copper.

13. The grounding bar as claimed in claim 8, wherein each concave recess is V-shaped or U-shaped.

14. A backlight module comprising:
   a plurality of coplanar lamps substantially situated on a common plane and having an electrode and a tube body respectively; and
   an elongated grounding bar, comprising:
      a first side portion;
      a bottom portion, connecting the first side portion and comprising a plurality of protrusions; and
      a second side portion, connecting the bottom portion, wherein the first side portion is closer to the tube body than the second side portion, and the bottom portion and the first and second side portions form a ditch with a solder material accommodated therein, and the protrusions are disposed between the first and second side portions;
      a plurality of concave cuts formed on one edge of the first and second side portions and aligned along an axis substantially parallel to the common plane, wherein a cross section of the grounding bar perpendicular to the axis is U-shaped, and the electrodes are disposed on the concave cuts.

15. The backlight module as claimed in claim 14, wherein the solder material is accommodated between the protrusions.

16. The backlight module as claimed in claim 14, wherein the protrusions are located around each concave cut.

17. The backlight module as claimed in claim 14, wherein the first side portion, the bottom portion, and the second side portion are formed as a unitary body.

18. The backlight module as claimed in claim 14, wherein each lamp comprises a rubber block between the tube body and the electrode, and the first side portion abuts the rubber block.

19. The backlight module as claimed in claim 14, wherein the grounding bar comprises copper.

20. The backlight module as claimed in claim 14, wherein each concave recess is V-shaped or U-shaped.

\* \* \* \* \*